Feb. 6, 1962     H. REIFEL     3,020,455

VIBRATORY CAPACITORS

Filed May 4, 1959

Inventor:
Harry Reifel,
by Robert J. Palmer
Attorney

United States Patent Office 3,020,455
Patented Feb. 6, 1962

3,020,455
VIBRATORY CAPACITORS
Harry Reifel, Waltham, Mass., assignor to Stevens-Arnold Inc., a corporation of Massachusetts
Filed May 4, 1959, Ser. No. 810,775
6 Claims. (Cl. 317—250)

This invention relates to vibratory capacitors such as are used for converting very small direct currents into proportional alternating currents, or for converting very small direct current voltages into proportional alternating current voltages.

It is well known that when a direct current voltage is placed across a pair of plates of a capacitor, and one of the plates is vibrated, an alternating current voltage which is proportional to the direct current voltage, will be produced across the plates. This alternating current voltage can be amplified in a conventional, stable, A.C. amplifier.

The vibratory plate of such a capacitor has been of magnetizable spring metal, cantilever supported at one end, with each half of its free end opposite the pole piece of an electromagnet. One of the electromagnets has been connected in the plate circuit of a vacuum tube, and the other electromagnet has been connected in the control grid circuit of the vacuum tube, in a regenerative feedback circuit. The tube oscillates at the resonant frequency of the vibratory plate, the electromagnet in the plate circuit acting as a motor, and the electromagnet in the grid circuit acting as a generator.

Such a prior capacitor has had a common magnetic circuit for both electromagnets which has allowed energy to be fed back to the grid circuit of the vacuum tube, in addition to that induced in the electromagnet in the grid circuit by the movement of the vibratory plate, resulting in undesired instability of operation.

A feature of this invention is that I improve the stability of such a capacitor by providing it with two magnetic circuits, one for each electromagnet. In one embodiment of this invention, this is accomplished by placing a brass strip along the longitudinal center of the vibratory plate, by placing a brass strip aligned with said brass strip along the center of the magnetizable metal, cantilever support for the vibratory plate, by using two polarizing magnets, and by spacing apart the supports of magnetizable metal for the electromagnets. The brass strips decouple magnetically, the two halves of the vibratory plate, and its cantilever support while leaving them mechanically coupled. The spacing apart of the remaining magnetic components serves to decouple them magnetically. With this arrangement, no magnetic energy can be fed from the magnetic circuit of the motor electromagnet to the magnetic circuit of the generator electromagnet.

The vibratory plate of such a capacitor, and its magnetic components, are usually mounted on a heavy plate of non-magnetic metal which is adapted to be secured across an open side of a hollow, heavy casting of non-magnetic metal, into the interior of which the vibratory plate and its components extend. The mass of the casting and plate prevent spurious mechanical vibrations from affecting the vibratory plate of the capacitor. The fixed plate of the capacitor is attached to a metal rod which extends through and is supported by a quartz cylinder in an opening in the opposite side of the casting, the rod serving as an input and an output terminal. An electrostatic shield is placed around the rod and the quartz cylinder where they protrude from the casting, such a shield previously having been closed except for a small clearance opening for the rod.

Such a quartz support for the terminal rod is highly susceptible to moisture in the ambient air, and heretofore, the moisture in the air confined within such an electrostatic shield has often deposited upon the surface of such a quartz support, to such an extent that the capacitor has been poorly operative or inoperative.

Another feature of this invention is that I have found that I can overcome or greatly reduce the effect of moisture in the ambient air on such a quartz support by placing a plurality of additional openings which may be in the form of slits, in the electrostatic shield, for providing adequate ventilation to prevent the deposit of moisture upon the quartz.

An object of this invention is to improve the stability of vibratory capacitors.

Another object of this invention is to provide two magnetically decoupled magnetic circuits for the two halves of a vibratile plate of a vibratory capacitor.

Another object of this invention is to reduce moisture deposition on a quartz support for a fixed plate of a vibratory capacitor.

This invention will now be described with reference to the annexed drawings, of which:

Figure 1:
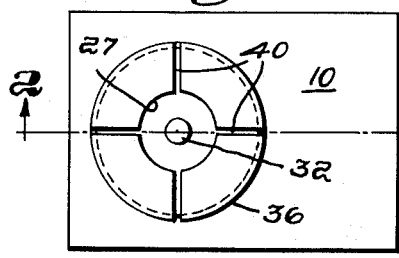
FIG. 1 is a top plan view of a vibratory capacitor embodying this invention.
Figure 2:
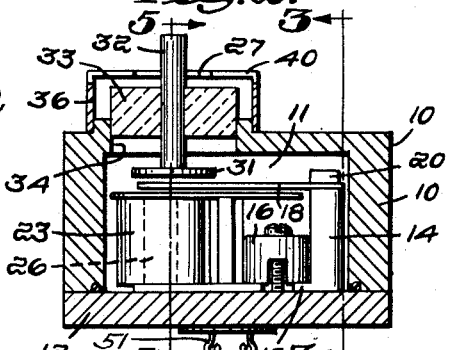
FIG. 2 is a section along the line 2—2 of FIG. 1.
Figure 3:
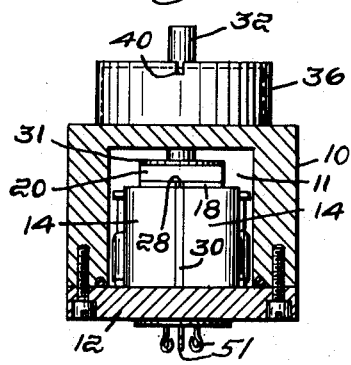
FIG. 3 is a section along the line 3—3 of FIG. 2.
Figure 5:
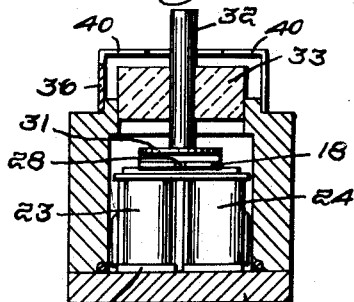
FIG. 5 is a section along the line 5—5 of FIG. 2.
Figure 4:
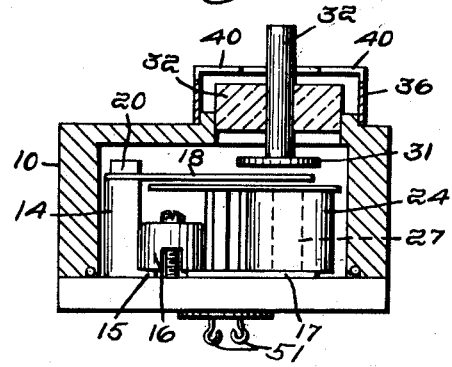
FIG. 4 is a section similar to FIG. 2 but looking from the opposite side of the capacitor.
Figure 6:
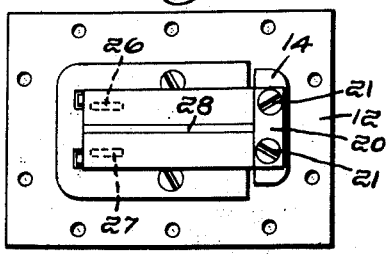
FIG. 6 is a top plan view of the vibratory plate of the capacitor.
Figure 7:
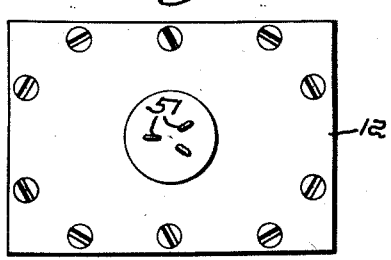
FIG. 7 is a bottom plan view of FIG. 6.

A heavy die casting of non-magnetic metal such as brass or bronze, has a hollow interior 11, with an open bottom which is normally closed by a heavy plate 12 of non-magnetic metal. The top of the plate 12 supports a vibratory plate support 14 of magnetic metal which has a lower shoulder 15; supports a pair of polarizing permanent magnets 16, and supports a pair of aligned, spaced-apart, thin sheets 17 of magnetic metal. The pole pieces of the magnets contact the shoulder 15 and the sheets 17.

A vibratory reed 18 of spring metal is cantilever supported at one end to the top of the support 14 by metal bar 20 and screws 21, and serves as the vibratory plate of the capacitor. Opposite the free end of the reed 17 are a pair of transversely aligned, electromagnets 23 and 24 which are supported, one on each of the sheets 17, the electromagnets 23 and 24 having pole pieces 26 and 27 respectively, which contact the sheets 17, and which extend through the electromagnets adjacent to the reed 18. The reed 18 has a brass strip 28 extending along its longitudinal center, dividing the reed into two halves, the free end of each half of the reed being over one of the pole pieces. The reed support 14 is divided along its center by a vertically extending brass strip 30 aligned with the strip 28. The strips 28 and 30 decouple magnetically, the two halves of the reed 18 and its support 14, respectively.

A magnetic circuit is completed through one half of the reed 18, one half of the reed support 14, one of the magnets 16, one of the sheets 17, and one pole piece 26. Another magnetic circuit is completed through the other half of the reed 18, the other half of the support 14, the other magnet 16, the other sheet 17, and the other pole piece 27.

A circular plate 31 of non-magnetic metal is supported by metal rod 32 of non-magnetic metal, over the free end of the reed 18, and is the stationary plate of the capacitor. The rod 32 extends through the axis of a quartz cylinder 33 which is fitted into a circular opening 34 in the top of the casting 10. The top of the casting 10 has a flange 35 around the lower portion of the quartz cylinder 33, and on which is force-fitted, the open bottom of a cylindrical, electrostatic shield 36 of brass. The top of the shield 36 has a central opening 37 smaller than the opening 34, through which the upper end of the rod 32 extends. The shield 36 has radially extending slits 40 in its top and part way down its vertical sides, which permit air to circulate through the shield for reducing the tendency of moisture in the air from depositing upon the surface of the quartz cylinder.

Figure 8:
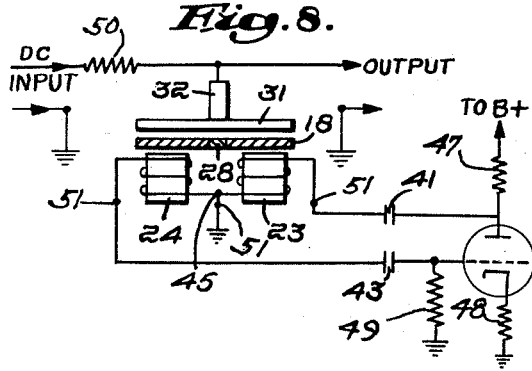
FIG. 8 is a simplified circuit of the capacitor, and the connections of its electromagnets in the plate and grid circuits of a vacuum tube used for vibrating the vibratory plate of the capacitor.

As shown by FIG. 8, the coil of the electromagnet 23 is grounded at one end and is connected at its other end through blocking capacitor 41 to the plate of triode vacuum tube 42, the control grid of which is connected through grid resistor 49 to ground, and through blocking capacitor 43 to one end of the coil of electromagnet 24, the other end of which is grounded. The plate of the tube 42 is also connected through load resistor 47 to B+. The cathode of the tube 42 is connected through bias resistor 48 to ground.

The casting 10 would be at ground potential, and the D.C. input would be between it and resistor 50 to the rod 32. The A.C. output would be between the rod 32 and the casting 10, the latter being shown as ground on FIG. 8.

The polarizing magnets 16 bias the reed 18 towards the electromagnets, for confining the vibration of the reed to the frequency of the current supplied to the electromagnet 23 instead of to twice the frequency.

*Operation*

In operation, when the tube 42 is turned on, it is shock excited into oscillation, and supplies current to the electromagnet 23 which pulls the free end of the reed 18 towards its pole piece 26. The movement of the free end of the reed towards the pole piece 27 of the electromagnet 24, induces a voltage in the coil of the latter, which is applied to the grid of the tube 42, causing the latter to go negative and reverse the current through the electromagnet 23. The latter then permits the reed to flex away from the electromagnets, causing the polarity of the voltage induced by the movement of the reed, in the coil 24 to reverse, causing the grid of the tube 42 to again go positive, following which the cycle is repeated.

The frequency of the vibration of the reed 18 should be its resonant frequency, but I have found that where a single magnetic circuit is employed, when the electromagnet 23 is energized, magnetic energy is transferred through the reed and its support to the pole piece of the electromagnet 24, causing a voltage to be induced in the coil of the latter in addition to the voltage induced by the movement of the reed. The generator voltage at the grid of the tube 42 thus is not, as it should be, voltage induced by movement of the reed only, so that the reed cannot vibrate at its resonant frequency. Its vibration is erratic resulting in a departure from the desired A.C. waveform it should develop. By magnetically decoupling the two halves of the reed and its support 14, and by spacing apart the remainders of the magnetic components associated with each reed half, no magnetic energy can be transferred to the pole piece of the electromagnet 24 by the energization of the electromagnet 23.

Vibration of the reed 18 serving as a capacitor plate, towards and from the fixed capacitor plate 31, modulates the D.C. voltage applied to the rod 32, causing a proportional A.C. voltage to be generated. This A.C. voltage can be amplified in a conventional, stable A.C. amplifier.

The slits 40 in the electrostatic shield 36 permit ventilating air to pass through the shield and around the surface of the quartz cylinder 33, greatly reducing the chance of moisture in the air depositing upon the cylinder. In prior electrostatic shields having only the central clearance opening for the rod 32, air confined within the shield often deposited moisture upon the surface of the quartz cylinder, causing sufficient leakage to render the vibratory capacitor inoperative.

What I claim is:

1. A vibratory capacitor comprising a base; a reed cantilever supported at one end to said base and forming a vibratory plate of said capacitor, said reed comprising two longitudinally extending strips of magnetic spring metal extending in a common plane and separated at the longitudinal axis of the reed by and joined together by a longitudinally extending strip of non-magnetic material extending in said plane; a motor electromagnet for driving said one strip and said reed at a predetermined frequency supported by said base with its polepiece facing and spaced from one side of the free end of one of said strips of magnetic metal; a generator electromagnet having a coil in which current is induced by movement of said reed and said one strip at said frequency, supported by said base with its polepiece facing and spaced from the free end of the corresponding side of the other of said strips of magnetic metal; a first magnetic circuit including said one strip and said pole piece of said motor electromagnet; a second magnetic circuit including said other strip and said polepiece of said generator electromagnet; a plate having a conductive surface facing and spaced from the side of said reed opposite the side facing said eletcromagnets and forming the fixed plate of said capacitor; a metal enclosure for said reed, said electromagnets and said plate having a conductive surface, secured to said base, and means insulatedly supporting said plate having a conductive surface from said enclosure.

2. A vibratory capacitor as claimed in claim 1 in which said reed is supported to said base by a support of magnetic metal divided into two portions by a strip of non-magnetic material aligned with said strip of non-magnetic material in said reed, and in which said first circuit includes one of said portions and said second circuit includes the other of said portions.

3. A vibratory capacitor as claimed in claim 2 in which said electromagnets are transversely aligned and supported on said base by transversely spaced apart, longitudinally extending straps of magnetic metal, one for each of said electromagnets, and in which one of said straps is included in one of said circuits, and in which the other of said straps is included in the other of said circuits.

4. A vibratory capacitor as claimed in claim 3 in which said straps terminate short of said support, and are connected to said two portions of said support by a pair of permanent magnets, and in which one of said permanent magnets is included in one of said circuits, and in which the other of said permanent magnets is included in the other of said circuits.

5. A vibratory capacitor as claimed in claim 4 in which said plate having a conductive surface has a terminal rod having a conductive surface in contact with said conductive surface extending through a clearance opening in the top of said enclosure, in which a quartz insulator is supported in said opening around said rod for supporting said rod from said enclosure, in which said insulator has an upper portion extending above said top of said enclosure, and in which an electrostatic shield is placed around said upper portion of said insulator in contact with said top of said enclosure, said shield having a clearance opening for said rod, and having a plurality of other openings in its top and sides for the passage of ventilating air.

6. A vibratory capacitor as claimed in claim 1 in which first and second permanent magnets are provided, and in which said first permanent magnet is aligned with said one strip adjacent to said one strip, and is included in said first circuit, and in which said second permanent magnet is aligned with said other strip adjacent to said other strip, and is included in said second circuit.

References Cited in the file of this patent

UNITED STATES PATENTS

| | | |
|---|---|---|
| 2,483,981 | Palevsky | Oct. 4, 1949 |
| 2,547,027 | Winkler | Apr. 3, 1951 |
| 2,573,329 | Harris | Oct. 30, 1951 |
| 2,957,062 | Bopp | Oct. 18, 1960 |